(12) United States Patent
Kim et al.

(10) Patent No.: US 7,099,376 B2
(45) Date of Patent: Aug. 29, 2006

(54) METHOD FOR PARALLEL TYPE INTERFERENCE CANCELLATION IN CODE DIVISION MULTIPLE ACCESS RECEIVER

(75) Inventors: Young Wha Kim, Taejon (KR); Seong Rag Kim, Taejon (KR); Sung Ho Cho, Seoul (KR)

(73) Assignee: Electronics and Telecommunications Research Institu, Taejon (KR)

( * ) Notice: Subject to any disclaimer, the term of this patent is extended or adjusted under 35 U.S.C. 154(b) by 915 days.

(21) Appl. No.: 09/995,740

(22) Filed: Nov. 29, 2001

(65) Prior Publication Data

US 2002/0186755 A1   Dec. 12, 2002

(30) Foreign Application Priority Data

Jun. 8, 2001   (KR) ............................... 2001-32125

(51) Int. Cl.
  *H04B 1/707* (2006.01)
(52) U.S. Cl. ........................................ 375/148; 375/144
(58) Field of Classification Search ........ 375/140–144, 375/147, 148, 150, 152
  See application file for complete search history.

(56) References Cited

U.S. PATENT DOCUMENTS 5,644,592 A   7/1997   Divsalar et al.

2002/0196841 A1 * 12/2002   Kama ........................ 375/147

FOREIGN PATENT DOCUMENTS

KR     2000/6470      1/2000
KR     10-0255565     2/2000

OTHER PUBLICATIONS

Correal et al., A DSP-Based DS-CDMA. . , IEEE Journal on Selected Areas in Communications, vol. 17, No. 4, Apr. 1999.

* cited by examiner

*Primary Examiner*—Jay K. Patel
*Assistant Examiner*—David B. Lugo
(74) *Attorney, Agent, or Firm*—Mayer, Brown, Rowe and Maw LLP

(57) ABSTRACT

A method for parallel type interference cancellation in a CDMA receiver, wherein minimum processing delay time is required while ensuring performance of an interference cancellation device, and space for embedding hardware for implementing the method can be reduced. The method for parallel type interference cancellation in a CDMA receiver, comprising: (a) when an over sample position of a received signal reaches the end of a symbol of a user, completing temporary detecting and recovering the symbol of the user; (b) generating a residual signal by using the recovered signal of the user and received signal state; and (c) detecting symbol information by obtaining an interference cancelled signal by adding the residual signal to the recovered signal of the user.

12 Claims, 7 Drawing Sheets

METHOD FOR PARALLEL TYPE INTERFERENCE CANCELLATION IN CODE DIVISION MULTIPLE ACCESS RECEIVER

FIELD OF THE INVENTION

The present invention relates to a method for parallel interference cancellation in a CDMA (code division multiple access) receiver, and, more particularly, to a method for parallel type interference cancellation in a CDMA receiver, by which minimum processing delay time is required while ensuring performance of an interference cancellation device, and space for embedding hardware for implementing the method can be reduced.

PRIOR ART OF THE INVENTION

CDMA (code division multiple access) is one of multiple access technologies, which uses a spread spectrum scheme, and a radio telecommunication scheme for transceiving signals of a number of users by sharing time and frequency.

In order to cancel unwanted signals of other users or other paths from received data that includes asynchronous signals from other terminals or via multi-path channels, an interference canceller is used in a CDMA receiver. As conventional interference cancellers, there are serial type interference cancellers, parallel type interference cancellers, and hybrid cancellers. The present invention relates to parallel interference cancellers, and, more particularly, to an asynchronous CDMA receiver having multiple transmission rates.

There are some conventional research results from Virginia Tech. in United States of America and Electronics Telecommunications Research Institute (ETRI) in Republic of Korea.

Virginia Tech. suggests consecutive interference cancellation since an operating step for processing detection and signal recovering, a subtracting step, and a dispreading step for re-detecting with the interference-cancelled signal are not arranged in one direction but these steps are mixed in consecutive processing procedure of operation in this method. Therefore, operating processing step and data to be processed for one bit operation are changed at every time so that additional control processing load increases to prepare for change of the operation steps and date access in addition to data operation itself. Therefore, in its hardware implementation, it is difficult to raise processing speed and process flow control becomes complex.

On the other hand, ETRI suggests interference cancellation in units of a block by gathering a number of bits or symbols. However, in its hardware implementation, memory buffer size increases and, because a portion is superposed synchronously and is re-detected conventionally, accuracy for such a superposed portion is degraded.

SUMMARY OF THE INVENTION

Therefore, it is an object of the present invention to provide a method for parallel type interference cancellation in a CDMA receiver, capable of effectively canceling interference for user signals bringing out mutual interference and detecting a signal to be received in asynchronous CDMA receiving environment.

It is another object of the present invention to provide a computer readable recording medium for recording a program for implementing the functions to effectively cancel interference for user signals bringing out mutual interference and detecting a signal to be received in asynchronous CDMA receiving environment.

In accordance with an aspect of the present invention, there is provided a method for parallel type interference cancellation in a CDMA receiver, the method comprising the steps of: (a) when an over sample position of a received signal reaches the end of a symbol of a user, completing temporary detecting and recovering the symbol of the user; (b) generating a residual signal by using the recovered signal of the user and received signal state; and (c) detecting symbol information by obtaining an interference cancelled signal by adding the residual signal to the recovered signal of the user.

In accordance with another aspect of the present invention, there is provided a computer readable recording medium storing instructions for executing a method for parallel type interference cancellation in a parallel type interference canceller of a CDMA receiver, the parallel type interference canceller having a micro-processor, the method comprising the steps of: (a) when an over sample position of a received signal reaches the end of a symbol of a user, completing temporary detecting and recovering the symbol of the user; (b) generating a residual signal by using the recovered signal of the user and received signal state; and (c) detecting symbol information by obtaining an interference cancelled signal by adding the residual signal to the recovered signal of the user.

BRIEF DESCRIPTION OF THE DRAWINGS

The above and other objects and features of the instant invention will become apparent from the following description of preferred embodiments taken in conjunction with the accompanying drawings, in which.

PREFERRED EMBODIMENT OF THE INVENTION

Herein, time, time point and timing represent processing time, time point and timing depending on only existence of pure available data without time being spent for operation and data transfer, respectively.

Figure 1:
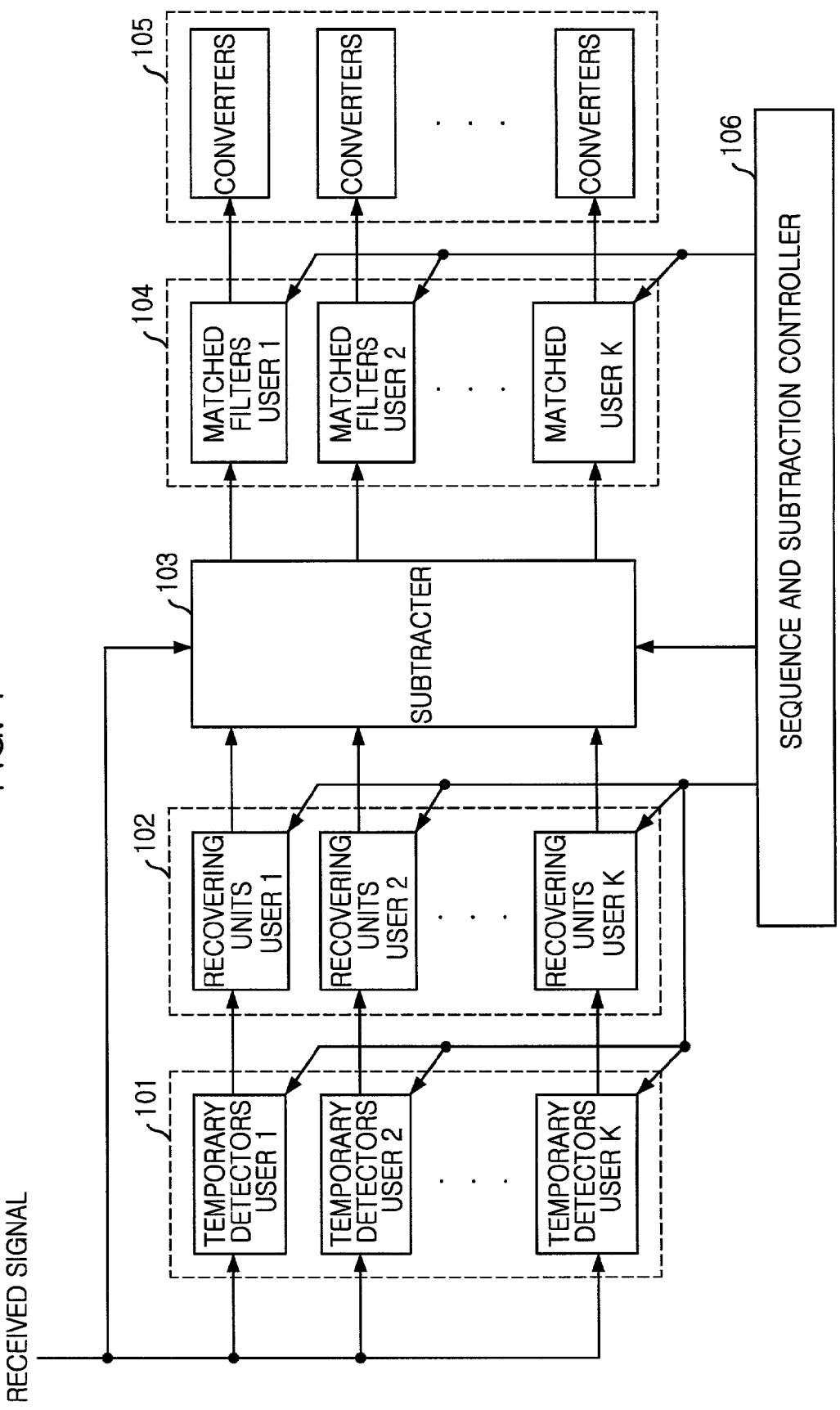
FIG. 1 shows a parallel type interference cancellation apparatus in a CDMA receiver to which the present invention is applied.

FIG. 1 shows a construction diagram of a parallel type interference cancellation apparatus in a CDMA receiver to which the present invention is applied.

As shown in FIG. 1, the parallel type interference cancellation apparatus of the CDMA receiver comprises temporary detectors 101, recovering units 102, a subtracter 103, matched filters 104, converters 105, and a sequence and subtraction controller 106.

A received signal, in which asynchronous user signals (herein, user signals and multi-path signals are referred to as user signals, for the sake of simplicity) are combined, is inputted to the CDMA receiver.

When the received signal is inputted, each of the temporary detectors 101 detects the signal for each user.

For interference cancellation, each of the recovering units 102 recovers each signal of a corresponding user by using the output signal of the corresponding one of the temporary detectors 101 and a result of a channel estimator (not shown).

The subtracter 103 subtracts all of signals of other users except the desired user, as interference, from the received signal so as to cancel mutual interference components from other user signals.

Each of the matched filters 104 performs matched filtering over each of the interference-cancelled signals.

Each of the converters 105 detects final symbol information for the output of the corresponding one of the matched filters 104.

The sequence and subtraction controller 106 controls the temporary detectors 101, the recovering units 102, the subtracter 103, the matched filters 104, and the converters 105.

Here, the above structure is referred to as a single stage parallel type interference cancellation apparatus. The single stage parallel type interference cancellation apparatus can be expanded to multi-stage. That is, the detected signals from the matched filters 104 and the converters 105 are subject to recovering in the recovering units 102 and interference cancellation in the subtracter 103 again and then another detected signals are obtained by the matched filters 104 and the converters 105. Such a structure is referred to as a multi-stage parallel type interference cancellation apparatus.

The expansion to the multi-stage parallel type interference cancellation apparatus as described above is also controlled by the sequence and subtraction controller 106.

Figure 2:
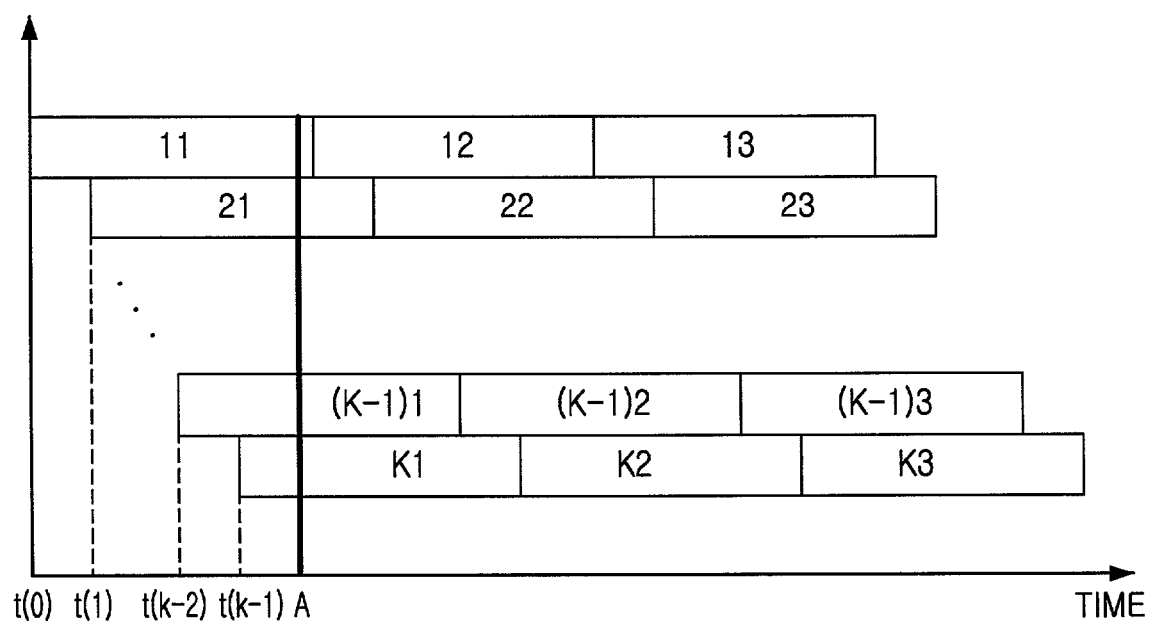
FIG. 2 is a timing diagram for explaining the case in which user signals are received asynchronously at a typical CDMA receiver.

FIG. 2 is a timing diagram for explaining the case in what user signals are received asynchronously at a typical CDMA receiver.

At first, it will be described for the case in that all of the asynchronous received user signals are transmitted with the same symbol duration.

As shown in FIG. 2, referring to a receiving time point of a first received user signal as t(0) and a receiving time point of a last received user signal as t(K−1).

The symbol of each user is illustrated as a rectangle including two numbers ij therein. Herein, i represents a user number and j represents a symbol order of the received signal of the i-th user. For example, (K−1)3 represents a third symbol information of a K−1-th user.

In such an environment, the user signals mutually interfere over two symbol durations due to mutated time alignment. That is, the received signal that is received at a time point A includes all of the user signal components that are at the time point A among the user signals.

Figure 3:
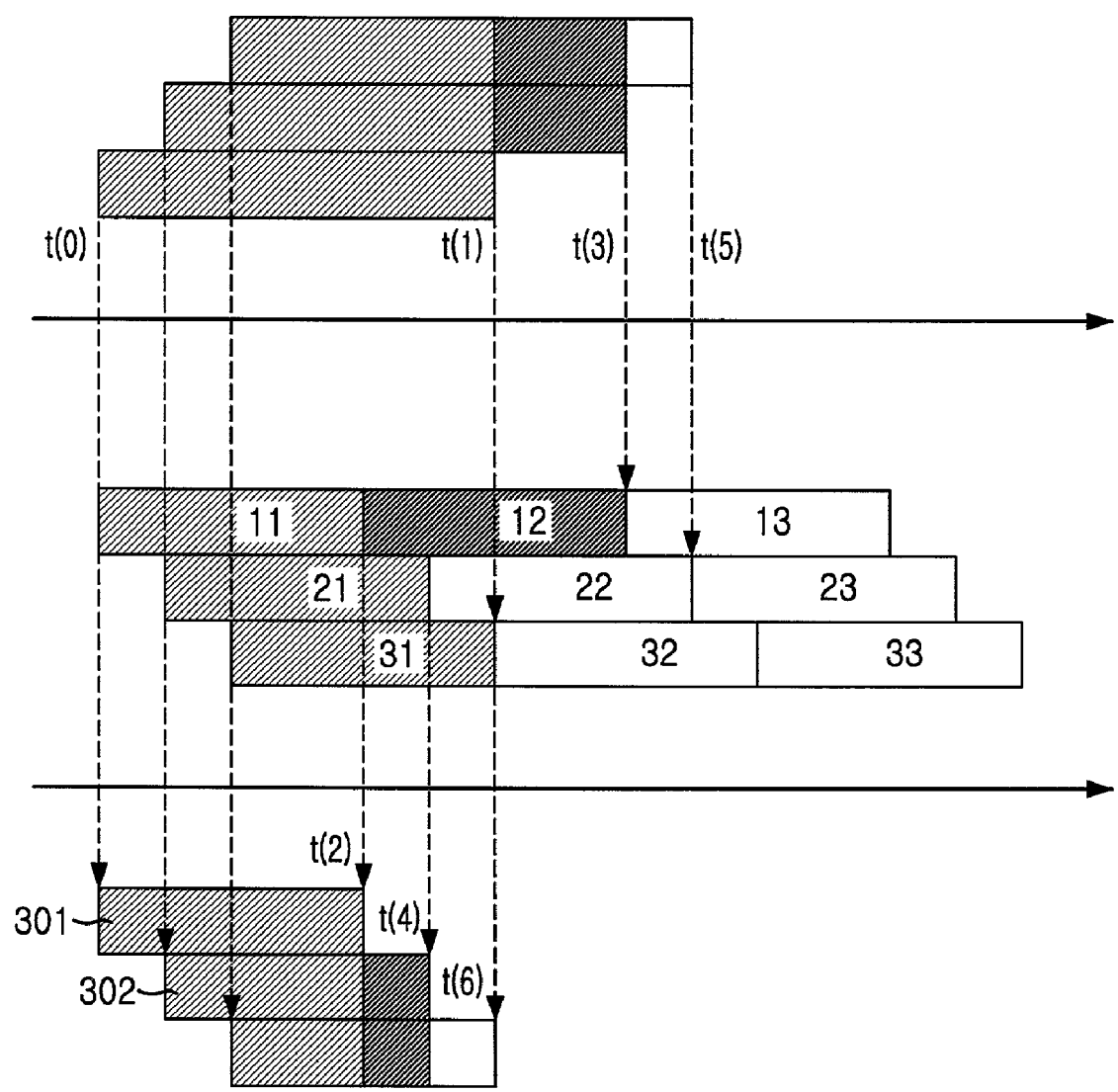
FIG. 3 offers a diagram of an example for illustrating the case in which user signals are processed by a method for parallel type interference cancellation in accordance with the present invention.

FIG. 3 offers a diagram of an example for illustrating the case in which the user signals is processed by a method for parallel type interference cancellation in accordance with the present invention.

As shown in FIG. 3, while a receiving completion time point of a symbol of a user 1, which is received beginning at t(0) and the signals are received by the receiver until a time point t(1), the temporary detection values for the user signals 11, 21, and 31 of the user 1, user 2, and user 3, i.e., all the users can be calculated.

Therefore, the time point t(1) represents a time point at which the recovered signals are obtained by temporary detection of the symbols of all the users and adjusting the amplitude and the phase information of the detected symbols after completion of receiving the signal of the latest user among the user signals included in the currently received signal.

However, although the recovered signal 11, 21, and 31 of all the users are obtained at the time point t(1), the recovered signals by the 12 and 22 symbol components for which detection is not yet completed and their corresponding recovered signals are not prepared can be summed by a time point t(2). Therefore, the signals to the time point t(2) are subtracted from the received signal to generate a residual signal 301. Then, an interference-cancelled signal is produced by the residual signal 301 at the time point t(2) and the recovered signal 11. After obtaining the interference-cancelled signal, an interference-cancelled and detected output of a first stage for the first received user 1 is obtained by performing detection for the interference-cancelled signal.

Further, when the signals are inputted to a time point t(3), the symbol 12 is temporarily detected and recovered. When the signals are inputted to a time point t(4), the interference-cancelled and detected signal for the 21 symbol information of the user 2 is obtained by generating the residual signal 302 by the time point t(4).

When the signals are inputted to a time point t(5), after temporary detection and recovery for the symbol 22 is completed, the interference cancelled and detected signal for the symbol information 31 of the user 3 is obtained by generating the residual signal by the time point t(6).

That is, when an over sample position of the received signal reaches the end of the symbol of the user, e.g., t(1), t(3), t(5), temporary detection and recovering for the corresponding symbol by the inputted data is completed [signals 11, 21, 31 for the time point t(1), signal 12 for the time point t(3) and signal 22 for the time point t(5)]. Then, by using the recovered signals, the residual signals are generated by the time point at which the recovered signals of all the users are available [t(2) for t(1), t(4) for t(3), t(6) for t(5)]. Then, by adding each of the residual signals and the corresponding one of the recovered signals to generate the interference-cancelled signal. Finally, by using the interference-cancelled signal as an input, the symbol of the user can be detected.

Figure 4:
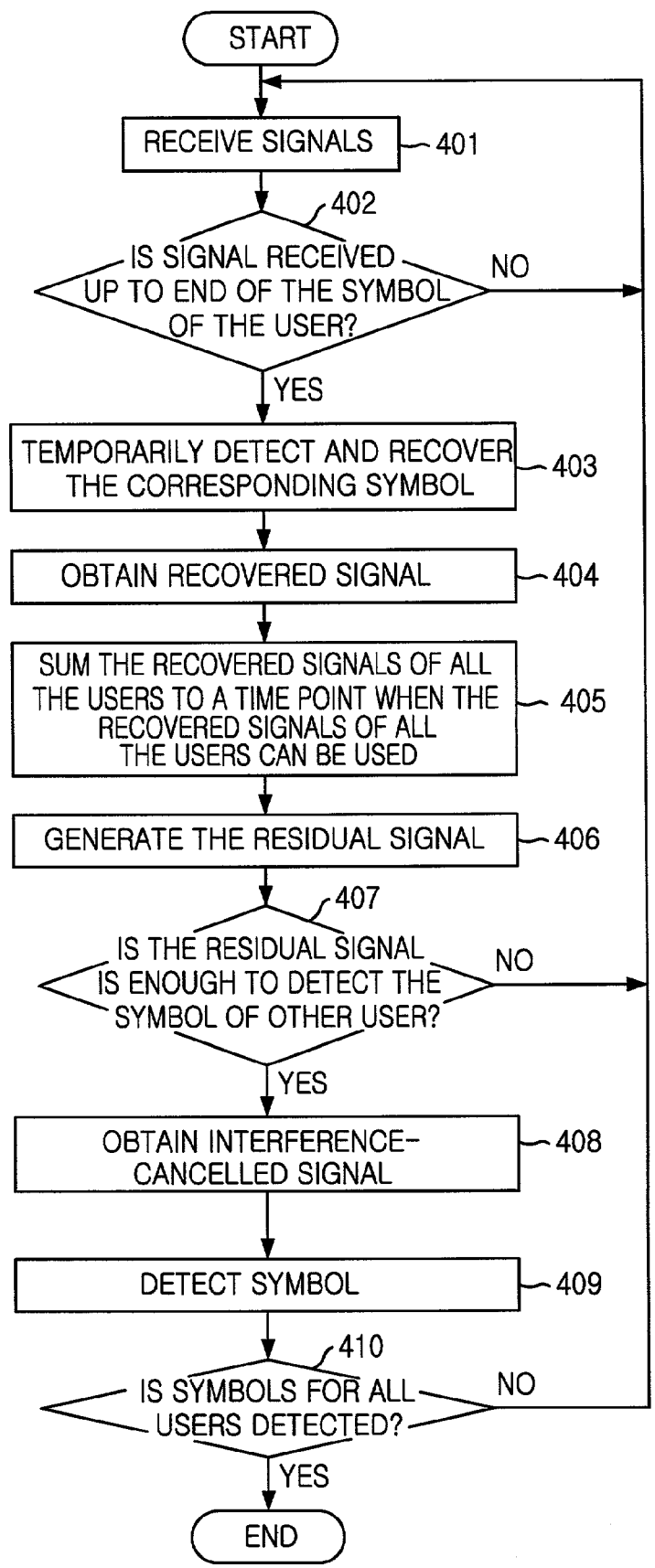
FIG. 4 provides a flow chart of an embodiment of a method for parallel type interference cancellation in accordance with the present invention.

FIG. 4 provides a flow chart of an embodiment of a method for parallel type interference cancellation in accordance with the present invention.

As shown in FIG. 4, when the signals are received asynchronously 401, e.g., the time point t(3) in FIG. 3, and an over sample position of the received signal reaches the end of the symbol of the user 402, temporary detection and recovering for the corresponding symbol by the inputted data is completed 403, e.g., the symbol 12 in FIG. 3.

Then, the channel estimator (not shown) obtains the recovered signal by adjusting the amplitude and the phase information of the temporarily detected signal 404.

On the other hand, when the recovered signals of all the users are aligned as same as the received signal state, the recovered signals of all the users to a time point when the recovered signals of all the users can be used, are summed on a time axis equal to the received signal state 405, and the summed signal is subtracted from the received signal to generate the residual signal 406.

When the residual signal is enough to detect the symbol of other user 407, the residual signal is added to the pre-generated recovered signal to obtain the interference-cancelled signal 408.

Therefore, from the interference-cancelled signal, the symbol can be detected by the matched filters and the converters 409. The process is repeated until a determination that symbols for all users are detected 410.

Figure 5:
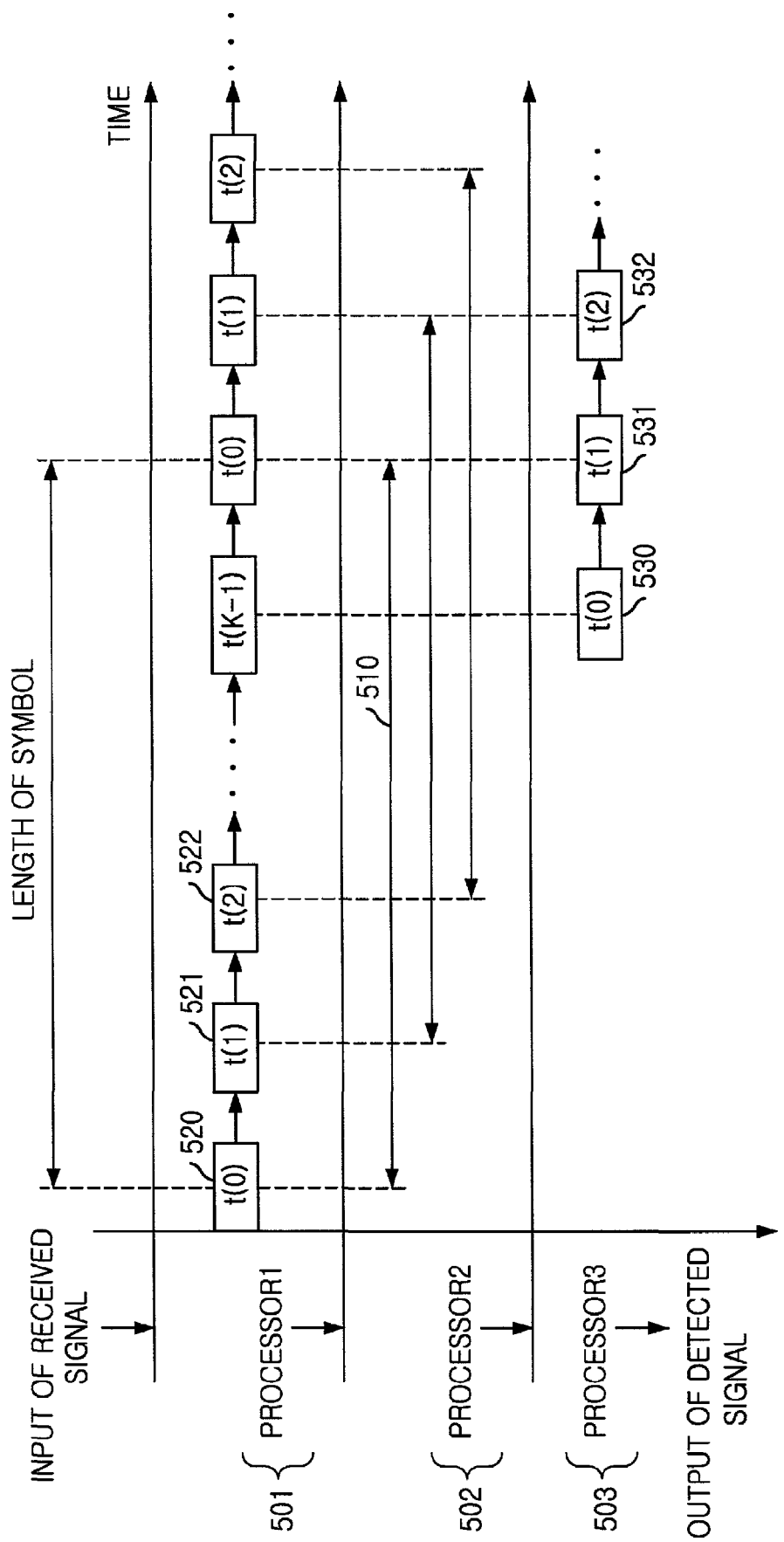
FIG. 5 is a timing diagram of an embodiment of a method for parallel type interference cancellation in accordance with the present invention.

FIG. 5 is a timing diagram of an embodiment of a method for parallel type interference cancellation in accordance with the present invention.

As shown in FIG. 5, the timing diagram of the method for interference cancellation of the present invention shows input timings t(i), i=0, 1, . . . , K−1, for received user signals that are received asynchronously in time and three processors 501, 502, 503 for processing the received user signals. The three processors are capable of repeating the timing with a period equal to the period of the received symbol.

During transfer of processed results through the processor 1 501, the processor 2 502 and the processor 3 503, the interference-cancelled output is obtained.

The start time point t(0) 520 of the processor 1 501 corresponds to a time point at which one symbol of the user signal that is received firstly is inputted completely and temporary detection and recovering are completed. At the time point t(0) 520, the processor 2 502 generates the residual signal from the time point t(0) at which the recovered signals of all the users are available, by the time point t(1) 521. The processor 3 503 performs matched filtering over the result from the processor 2 502 by the matched filters 104, but does not perform symbol detection.

At the time point t(1) of the processor 1 501, at which input of one symbol of a next user is completed, the processor 2 502 generates a further residual signal from the time point t(1) 521, by the time point t(2) 522 and the processor 3 503 additionally performs matched filtering of the result from the processor 2 502 by the matched filters 104, but does not performs symbol detection.

As described above, upon completing the processing of the processor 1 501 by the time point t(K−1), the processor 2 502 completes generating the residual signal 510 so as to detect the symbol of the user 1 that is received firstly, and the processor 3 503 adds, at the time point t(0) 530, the residual signal to the recovered signal at the time point t(K−1) so as to generate the interference-cancelled signal and finally detect the symbol by using the interference-cancelled signal.

That is, the signal of one symbol that is inputted at the time t(0) 520 of the processor 1 501 can be detected by the interference-cancelled output at the time point t(0) 530 of the processor 3 503.

By repeating the above procedures, the input signal at the time point t(1) 521 of the processor 501 is detected by the interference-cancelled output signal at the time point t(1) 531 of the processor 2 503 and so on.

Figure 6:
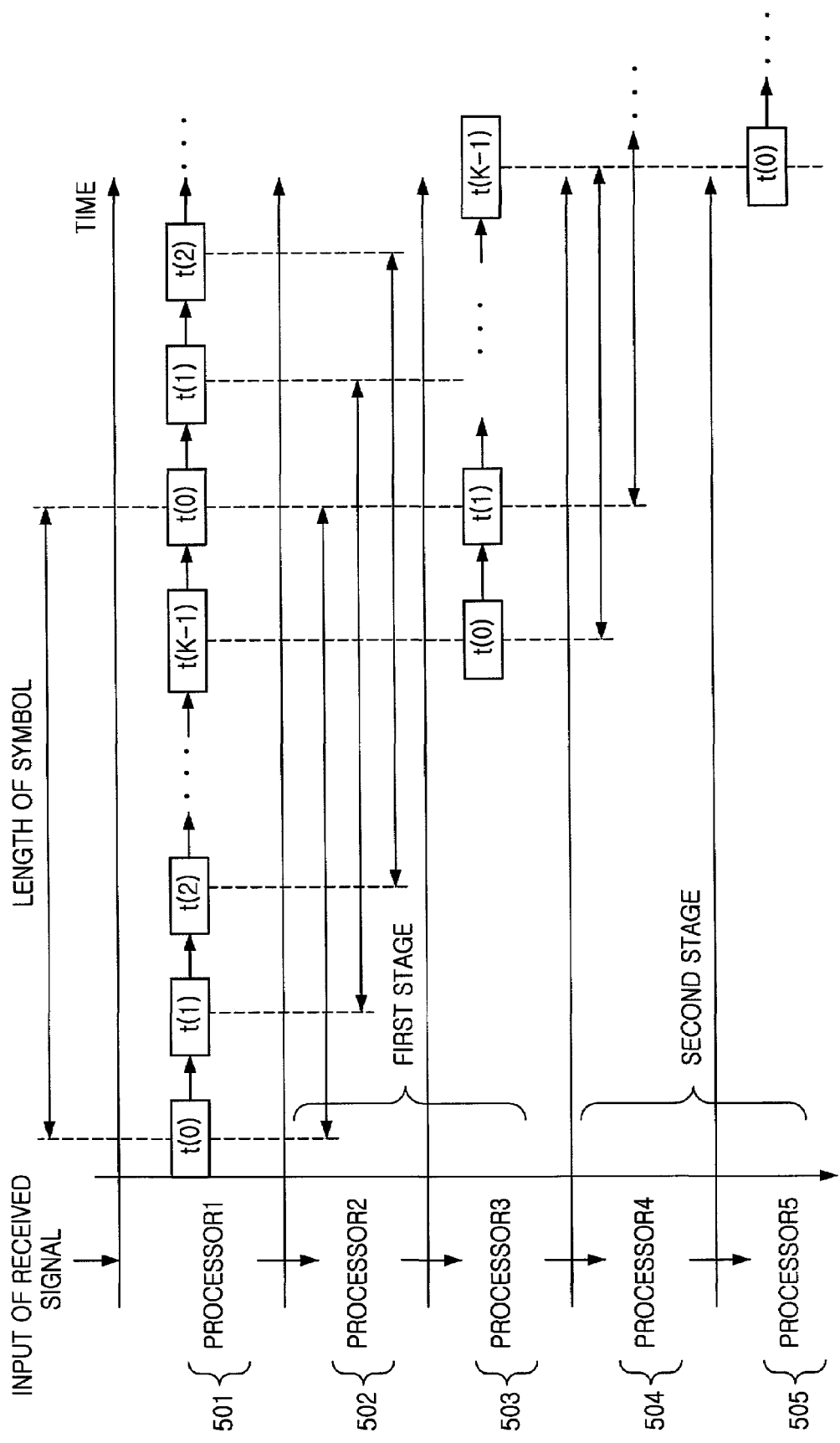
FIG. 6 is a timing diagram of an embodiment of a method for multi-stage parallel type interference cancellation in accordance with the present invention.

FIG. 6 is a timing diagram of an embodiment of a method for multi-stage parallel type interference cancellation in accordance with the present invention, in which the single stage parallel type interference cancellation method as described above in conjunction with FIGS. 3 to 5 is repeated one or more times. Herein, there is provided a case in which an additional interference cancellation stage is added. It should be noted that this expanding scheme from a single stage to a two-stage may be applied to expansion to three or more-stage.

As shown in FIG. 6, for the multi-stage parallel type interference cancellation method, there are further provided a processor 4 504 and a processor 5 505 after the processor 3 503. The relation between the processor 3 503 and the processor 4 504 is similar to that between the processor 1 501 and the processor 2 502. Also, the relation between the processor 4 504 and the processor 5 505 is similar to that between the processor 2 502 and the processor 3 503.

Figure 7:
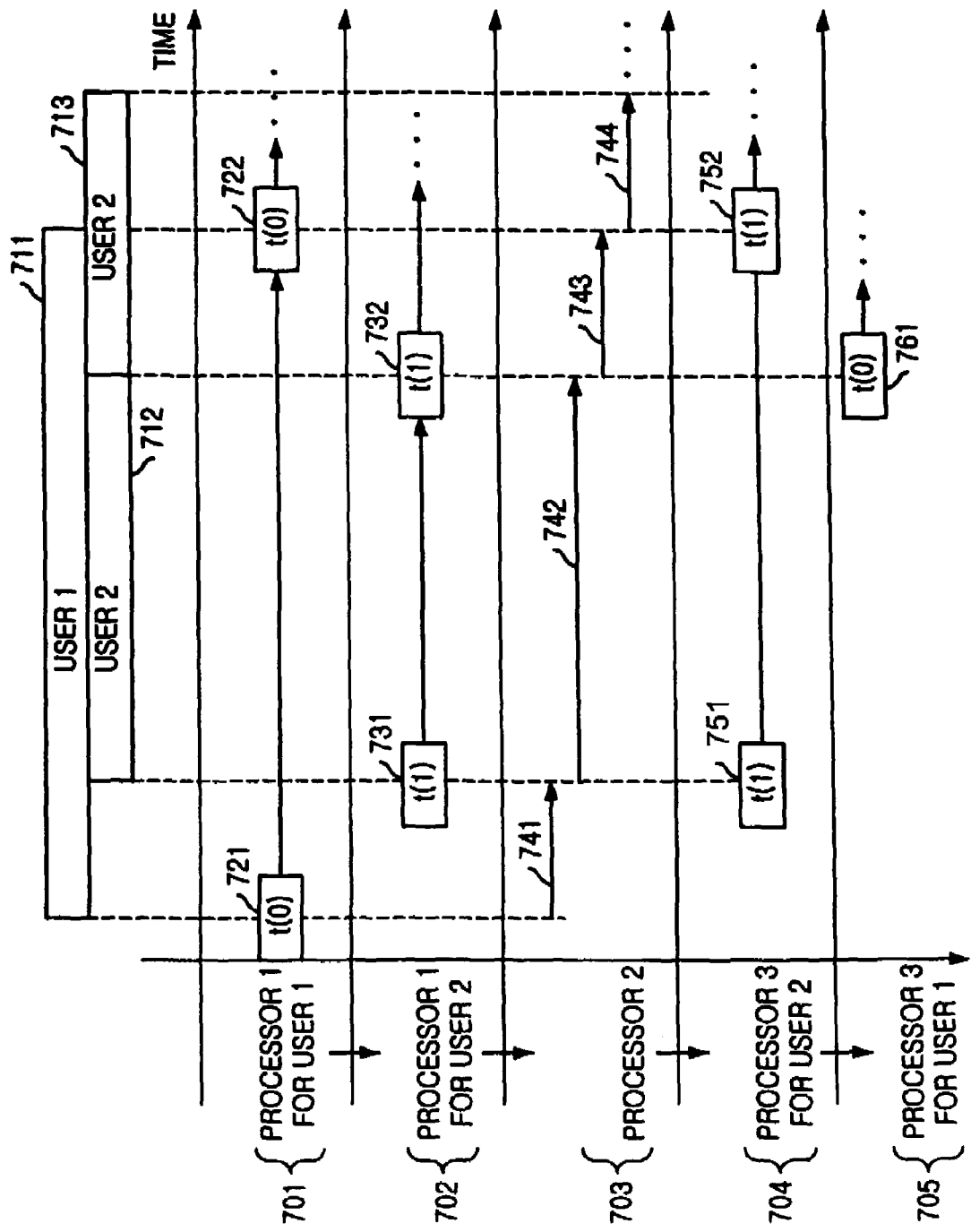
FIG. 7 is a timing diagram of an embodiment of a method for parallel type interference cancellation in accordance with the present invention in multi-transmission rate signal environment.

FIG. 7 is a timing diagram of an embodiment of a method for parallel type interference cancellation in accordance with the present invention in multi-transmission rate signal environment.

The multi-transmission rate represents that the symbol duration of the received signals of the multiple users are different from each other. The longest symbol duration is 2's power ($2^n$, n is an integer larger than 1) of the symbol duration of any other user.

For example, explaining for the number of chips included in one symbol duration in CDMA spreading, if the longest symbol duration is 256 chips, then other user has its symbol duration among 128, 64, 32, 16, 8, 4, 2, or 1 chip.

As shown in FIG. 7, it is assumed that the user 1 has the longest symbol duration 711 and the user 2 has its symbol durations 712, 713, half the symbol duration of the user 1. That is, the two symbol duration of the user 2 are equal to the symbol duration of the user 1. The signal of the user 1 is received at the time point t(0) 721, 722 and the signal of the user 2 is received at the time point t(1) 731, 732, asynchronously from each other.

At the time point t(0) 721, the processor 1 701 for the user 1 completes temporary detection and recovery for the symbol 711 of the user 1 and the processor 2 703 generates the residual signal 741. Then, at the time point t(1) 731, the processor 1 702 completes temporary detection and recovery for the first symbol 712 of the user 2 and the processor 2 703 further generates the residual signal 742.

By using the residual signal 742 and the recovered signal at the time point t(1) 731, the processor 3 704 for the user 2 completes detection for the first symbol 712 of the user 2.

Then, at the time point t(1) 732, the processor 1 702 for the user 2 completes temporary detection and recovery for the second symbol 713 of the user 2 and the processor 2 703 further generates the residual signal 743.

By using the residual signals 741, 742, and the recovered signal at the time point t(0) 721, the processor 3 705 for the user 1 completes detection for the symbol of the user 1 at the time point t(0) 761.

At the time point t(0) 722, the processor 1 701 for the user 1 completes temporary detection and recovery for the next symbol 711 of the user 1 and the processor 2 703 generates the residual signal 744. By using the residual signal 744, the previous residual signal 743 and recovered signal at the time point t(1) 732, the processor 3 704 for the user 2 completes detection for the second symbol 713 of the user 2.

In the multi-transmission rate case, two symbols 751, 752 of the user (user 2) that has its transmission rate twice the transmission rate of the user (user 1) that has the longest symbol duration can be sequentially detected.

That is, in the multi-transmission rate environment, processing flow is similar to the single transmission rate in that the residual signal is generated only to the time point at which the recovered signals of all the users are available and inter-processor connection is accomplished through the residual signal, but the former is different from the latter in that the processor 1 and the processor 3 performs temporary detection and recovering processing at every symbol duration that is shorter than the longest symbol duration by a certain integer so as to detect the integer times symbols.

On the other hand, by applying the expansion concept from FIG. 5 to FIG. 6, this may be expanded to a multi-stage parallel type interference cancellation method that may be controlled by the sequence and subtraction controller 106.

The method of the present invention as described above may be implemented as a program to be stored at a computer readable recording medium (CD ROM, RAM, ROM, floppy disk, hard disk, magneto-optical disk, and etc.).

The present invention as described above has an effect of minimizing processing delay time required for interference cancellation in CDMA receiving environment to realize a parallel type interference cancellation apparatus having fast response characteristic.

Further, the present invention saves storage space for intermediate processing results that is to be used in the interference cancellation so as to reduce hardware scale in implementation of the parallel type interference cancellation apparatus.

Further, the present invention introduces fast operation processors by minimizing the delay time so as to maximize efficiency of resources in a next generation mobile communication environment that requires faster data transceiving.

While the present invention has been shown and described with respect to the particular embodiments, it will be apparent to those skilled in the art that many changes and modifications may be made without departing from the spirit and scope of the invention as defined in the appended claims.

What is claimed is:

1. A method for parallel type interference cancellation in a CDMA receiver, the method comprising the steps of:
    (a) when an over-sampled position of a received signal reaches the end of a symbol of a user, completing temporary detecting and recovering the symbol of the user;
    (b) generating a residual signal by using the recovered signal of the user and a received signal state; and
    (c) detecting symbol information by obtaining an interference cancelled signal by adding the residual signal to the recovered signal of the user, wherein the step (a) includes:
    (a1) checking whether the end of the symbol of the user is received, and, if the end of the symbol of the user is not received, receiving a signal; and, otherwise, performing temporary detecting for the symbol of the user, and
    (a2) obtaining the recovered signal by adjusting the amplitude and the phase information of the temporarily detected signal.

2. The method as recited in claim 1, further comprising the step of:
    (d) repeating the recovering of the symbol of step (a) by using the detected result of detecting step (c) as a temporary detection result to raise accuracy of signal detection.

3. The method as recited in claim 1, wherein the step (b) includes:
    (b1) for a time point at which the recovered signals of the users are available, adding the recovered signals of the users only up to the time point;
    (b2) generating the residual signal by subtracting the added signal from the received signal.

4. The method as recited in claim 1, wherein the step (c) includes:
    (c1) adding the recovered signals of the users only to a time point at which the length of the residual signal is enough to detect the symbol of the user;
    (c2) detecting the symbol by performing matched filtering and converting for the interference cancelled signal.

5. The method as recited in claim 1, wherein the lengths of the symbols are equal to each other in the received signal.

6. The method as recited in claim 1, wherein the lengths of the symbols are different from each other in the received signal.

7. A computer readable recording medium storing instructions for executing a method for parallel type interference cancellation in a parallel type interference canceller of a CDMA receiver, the parallel type interference canceller having a micro-processor, the method comprising the steps of:
    (a) when an over-sampled position of a received signal reaches the end of a symbol of a user, completing temporary detecting and recovering the symbol of the user;
    (b) generating a residual signal by using the recovered signal of the user and a received signal state; and
    (c) detecting symbol information by obtaining an interference cancelled signal by adding the residual signal to the recovered signal of the user, wherein the step (a) of the method includes:
    (a1) checking whether the end of the symbol of the user is received, and, if the end of the symbol of the user is not received, receiving a signal; and, otherwise, performing temporary detecting for the symbol of the user, and
    (a2) obtaining the recovered signal by adjusting the amplitude and the phase information of the temporarily detected signal.

8. The computer readable recording medium as recited in claim 7, wherein the method further comprises the step of:
    (d) repeating the recovering of the symbol of step (a) by using the detected result of detecting step (c) as a temporary detection result to raise accuracy of signal detection.

9. The computer readable recording medium as recited in claim 7, wherein the step (b) of the method includes:
    (b1) for a time point at which the recovered signals of the users are available, adding the recovered signals of the users only up to the time point;
    (b2) generating the residual signal by subtracting the added signal from the received signal.

10. The computer readable recording medium as recited in claim 7, wherein the step (c) of the method includes:
    (c1) adding the recovered signals of the users only to a time point at which the length of the residual signal is enough to detect the symbol of the user;
    (c2) detecting the symbol by performing matched filtering and converting for the interference cancelled signal.

11. The computer readable recording medium as recited in claim 7, wherein the lengths of the symbols are equal to each other in the received signal.

12. The computer readable recording medium as recited in claim 7, wherein the lengths of the symbols are different from each other in the received signal.

* * * * *